United States Patent [19]

Fenwick et al.

[11] 4,001,692
[45] Jan. 4, 1977

[54] TIME DIVERSITY DATA TRANSMISSION APPARATUS

[75] Inventors: Robert B. Fenwick, Palo Alto; Clinton R. Gilliland, Menlo Park, both of Calif.

[73] Assignee: Barry Research Corporation, Sunnyvale, Calif.

[22] Filed: July 7, 1975

[21] Appl. No.: 593,690

[52] U.S. Cl. .............................. 325/38 R; 325/39; 325/40; 325/42; 325/56; 325/60; 343/204

[51] Int. Cl.² .................................................. H04B 7/06

[58] Field of Search ................ 325/56, 59, 60, 154, 325/40, 38 R, 39, 473–476, 65, 42; 343/176, 178, 200, 204; 179/15 R, 15 FD, 15 BA; 340/172.5

[56] References Cited

UNITED STATES PATENTS

| 3,195,048 | 7/1965 | Adams ................... 325/56 |
| 3,409,875 | 11/1968 | De Jager et al. ............ 325/59 |
| 3,422,357 | 1/1969 | Browne ................. 325/56 X |
| 3,526,837 | 9/1970 | Zegers et al. ............. 325/59 X |
| 3,842,352 | 10/1974 | Cote ................... 325/56 |

*Primary Examiner*—Robert L. Richardson
*Assistant Examiner*—Michael A. Masinick
*Attorney, Agent, or Firm*—Flehr, Hohbach, Test, Albritton & Herbert

[57] ABSTRACT

An asynchronous, time diversity transmission apparatus including a data encoder at a transmitting location and an error-correcting data decoder at a receiving location for overcoming the effects of signal fading, impulsive noise and interference. The asynchronous data encoder encodes a single input data stream into three or more redundant, parallel data outputs having time diversity introduced by successive delays. The data outputs are frequency multiplexed and propagated over a transmission circuit. Received data is demultiplexed and input to the data decoder where it is processed to remove the time diversity. Three or more outputs from the decoder are combined to form a single, error-corrected data output.

25 Claims, 5 Drawing Figures

TIME DIVERSITY DATA TRANSMISSION APPARATUS

BACKGROUND OF THE INVENTION

The present invention relates to transmission apparatus including encoders and decoders useful for forward error correction and more specifically to transmission circuits in which the effects of signal loss, noise, and interference, or any of them, are time variable. The present invention is particularly useful in high frequency and troposcatter radio circuits.

Signal fading, impulsive noise and interference are deleterious effects frequently encountered in many transmission circuits. Where these effects are present, the quality of transmission is deteriorated and an increase in the transmission error-rate occurs. Radio circuits employed to transmit teleprinter information are particularly susceptible to these deliterious effects. Radio teleprinter information is typically transmitted at a rate of up to 75 bits per second (baud).

The quality of a transmission circuit is frequently measured in terms of its character error rate (CER). The character error rate is defined as the percentage of erroneous characters received relative to the total number of characters transmitted in a given time period.

Prior art techniques for improving the performance of data transmission circuits have utilized many different forms of redundancy in connection with forward error correction. Diversity systems employing space diversity, polarization diversity, frequency diversity or time diversity have all been known in one form or another.

The term "time diversity" has usually been interpreted to mean synchronous transmission of data two or more times with a time delay between each transmission. Each received data bit is compared with a corresponding delayed data bit. In such systems, synchronous operation is required in order to identify each bit. Synchronous operation has the undersireable requirement of being dependent upon the transmission data rate. A change in data rate requires a corresponding change in synchronous clocking in the transmitter and receiver apparatus. If a difference is observed between bits as a result of a comparison of bits, an error is identified. When an error is identified, one of the data bits, for example the earlier transmitted data bit, is the one selected for actual use. A time diversity system of this type has been described by L. E. Zegers in an article entitled "Error Control in Telephone Channels By Means of Time Diversity" appearing in the *Philips Research Report*, volumn 22, June, 1967.

The term "time diversity" has also been applied to systems in which data bits are divided in time, with one half of each bit being transmitted on one frequency and the other one half of each bit being transmitted on another frequency.

The performance quality of known diversity systems is not entirely satisfactory particularly when the effects of signal loss, noise or interference have a duration of up to several seconds. There is a need, therefore, for improved and economical apparatus useful in improving transmission and reducing character error rates in transmission circuits.

SUMMARY OF THE INVENTION

The present invention is an asynchronous time diversity method and apparatus which provides forward error correction in the transmission of data. The asynchronous capability of the invention permits many different transmission data rates to be utilized without requiring changes in operating frequency.

In transmitter circuitry, a serial input data stream is converted to three or more transmitter data streams. The transmitter data streams are each substantially identical to the input data stream except that in order to obtain time diversity, the transmitter data streams are successively delayed, in an encoder, relative to the input data stream. The transmitter data streams are multiplexed and transmitted to a receiver.

In receiver circuitry, a received signal is demultiplexed asynchronously to form three or more receiver data streams, one for each of the transmitter data streams. The receiver data streams are successively delayed, in a decoder, to remove the time diversity. The relative delays removed from the receiver data streams by the receiver decoder correspond to the relative delays introduced into the transmitter data streams by the transmitter encoder. The receiver data streams, after removal of time diversity, are algebraically added to form a sum data stream. The sum data stream is compared with a threshold to form an error-corrected output data stream.

In one preferred embodiment of the invention, the transmitter encoder includes two or more delay circuits for delaying the input data stream. The delay circuits are, for example, shift register stages which step the input data stream under control of an encoder clock. The input data stream is utilized as a first transmitter data stream. The output from the first shift register stage provides a delayed second transmitter data stream. The second transmitter data stream in turn is input to a second shift register stage and is delayed to provide a third transmitter data stream. Up to N transmitter data streams with successive delays are obtained with N shift register stages.

The frequency of the encoder clock is selected to be twenty or more times the data rate (baud rate) of the input data stream. Lower encoder clock frequencies tend to introduce increasing numbers of errors. While an asynchronous encoder clock appears more desireable in order to allow operation without change for many different data rates, bit synchronous encoder clocks can also be employed.

In one embodiment, each of the transmitter data streams is frequency multiplexed, is transmitted to the receiver, and is demultiplexed. After demultiplexing, there is one receiver data stream for each transmitter data stream.

The receiver decoder includes a delay circuit for each of the receiver data streams. The delay circuits include, for example, a plurality of shift register stages which are each stepped by a decoder clock. The number of stages in each delay circuit varies and is selected to remove the time diversity from the receiver data streams. The delay inserted in the transmitter data stream when added to the delay inserted in the corresponding receiver data stream is equal to a constant delay for all data streams. The constant delay is established by making the total number of shift register stages travelled by the combination of a transmitter data stream and the corresponding receiver data stream equal to a constant.

In accordance with one feature, an integrating volt meter is provided for indicating the level of the output from the summing amplifier as an indication of the transmission character error rate. Signals having a level near a threshold level tend to exhibit a high bit error rate while signals having a large deviation from the threshold level tend to have a low bit error rate.

In accordance with another feature, individual data stream comparators are provided for comparing the error-corrected data output with the outputs from each of the receiver delay circuits. In this manner, data streams which are in disagreement with the error-corrected data output are identified.

In accordance with another feature, a channel selection circuit is provided for adding and dropping data streams. In one example, the number of data streams (channels) can vary between 3 and 7. The determination of the number of channels employed may be based upon the character error rate determined by the integrating volt meter. A greater character error rate suggest the addition of more channels while a low character error rate suggest that channels may be eliminated.

In accordance with the above summary of the invention, the present invention achieves the objective of providing an improved asynchronous time diversity method and apparatus which provides forward error correction in the transmission of data.

Additional objects and features of the invention will appear from the following description in which the preferred embodiments of the invention have been set forth in detail and in conjunction with the drawings.

DETAILED DESCRIPTION

Figure 1:
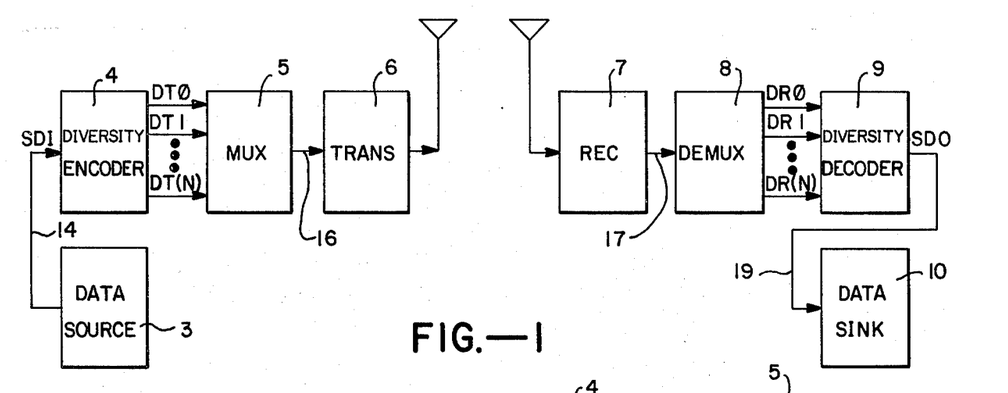
FIG. 1 depicts a block diagram representation of an asynchronous time diversity system including transmitter and receiver circuitry in accordance with the present invention.

In FIG. 1, the transmitter circuitry includes the data source 3, the diversity encoder 4, the multiplexer 5, and the transmitter 6. The receiver circuitry includes the receiver 7, the demultiplexer 8, the diversity decoder 9, and the data sink 10.

In FIG. 1, the data source 3 provides on line 14 a serial stream of binary input data to the encoder 4. Data source 3 is any conventional source of binary data such as a teletypewriter.

The diversity encoder 4 of the present invention receives the input data stream on line 14 and forms three or more transmitter diversity data streams DT0, DT1, ..., DT(N). The encoder 4 is capable of asynchronous operation with respect to the input data on line 14. Additionally, encoder 4 is not required to make any change in the coding of data on line 14 and is not required to identify individual bits in the data stream on line 14. DT0 is typically the input data stream and each of the data streams DT1, ..., DT"N" is delayed after DT0 by successive amounts. The transmitter diversity data streams DT0, ..., DT(N) are input to a conventional multiplexer 5.

Multiplexer 5 is any conventional multiplexer for multiplexing up to N+1 of the diversity data streams over separate channels of a common data path 16.

The multiplexed information on data path 16 is transmitted through a conventional transmitter 6 to a conventional receiver 7 and appears in multiplexed form on data path 17 as an input to a demultiplexer 8.

Demultiplexer 8 is any conventional device compatible with multiplexer 5. The demultiplexer 8 demultiplexes the information on data path 17 to form the data receiver diversity data streams DR0, DR1, ..., DR(N).

The diversity decoder 9 in accordance with the present invention removes the time diversity from the diversity data streams DR0, ..., DR(N) and forms a single error-corrected stream on line 19. Decoder 9 can operate asynchronously with respect to the diversity data streams and without identifying individual bits.

In FIG. 1, the data sink 10 is any conventional device for receiving the error-corrected data stream as binary digital data from line 19. Data sink 10 can be, for example, another teletypewriter.

The time diversity system of FIG. 1 has a variable redundancy capability in that the number of active channels can be varied. Any number greater than two can be employed. Channels not employed in one time diversity system, are available, of course, for transmitting other data. The overall data transmission rate may be increased and decreased depending upon the number of channels active in the time diversity system.

Figure 2:
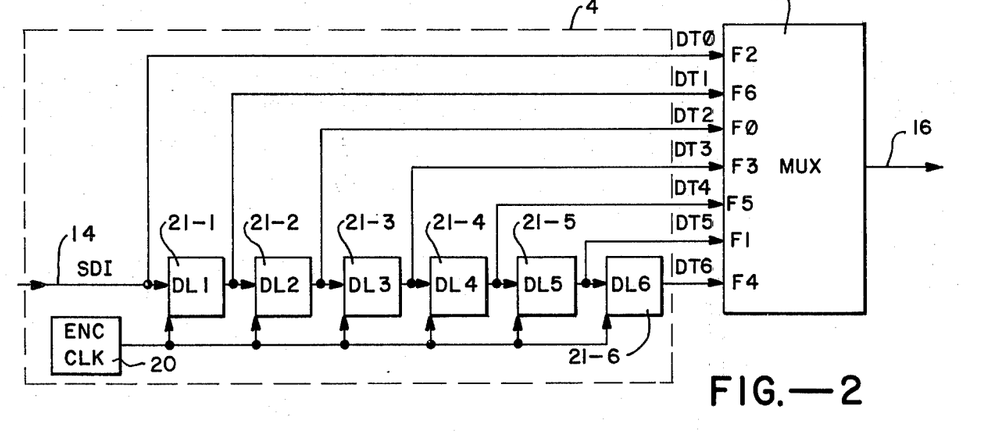
FIG. 2 depicts a block diagram representation of a data encoder and a frequency multiplexer which form a part of the transmitter circuitry within the system of FIG. 1.

DIVERSITY ENCODER — FIG. 2

In FIG. 2, one preferred embodiment of the diversity encoder 4 of FIG. 1 is shown in detail. The serial input data stream on line 14 appears as the first transmitter diversity data stream DT0 and connects to the delay stages 21. The delay stages 21-1, ..., 21-6 provide successive delays DL1, ... DL6, respectively, of the input data stream DT0. The outputs from delays DL1, DL2, ..., DL6 provide the transmitter diversity data stream signals DT1, DT2, ... DT6, respectively. The signal DT1 is delayed behind the input signal DT0 by the amount of delay DL1. Similarly, the signal DT2 is delayed behind the signal DT1 by the amount of delay DL2. Each of the other signals DT3 through DT6 is delayed in a similar manner.

The delay circuits 21 are any conventional delay devices for delaying binary signals. In a preferred embodiment, each of the delays 21 is a 2048-bit shift register stage. The 2048-bit stages are selected because of their ready commercial availability. Of course, shift register stages of any size can be employed. The shift register stages 21 are shifted by an encoder clock (ENC CLK) 20. For each clock pulse from clock 20, the logical 1 or 0 level of the respective input signal is loaded into the first bit position of shift register stage. The contents of the other bit locations in each of the shift register stages are stepped also for each clock pulse in a conventional shift register manner.

In a preferred embodiment, the encoder clock 20 has a frequency of 2KHz. Therefore, the delay of each delay circuit 21 is 1.024 seconds. Clock 20 is a conventional crystal controlled oscillator which provides an output which does not vary more than one part in $10^5$. The frequency of clock 20 is selected to be twenty times greater than the baud rate of the data on input line 14. With a twenty-times greater clock frequency, the signal on line 14 is sampled twenty times for each digital bit on line 14. Therefore, the sampling error introduced into any data bit on line 14 will be comparatively small, that is, not greater than two out of twenty. If less error is desired, then the clock frequency can be made more than twenty times greater than the input data rate. The number of bits in each of the delay stages 21-1 through 21-6 is determined in conjunction with the frequency of clock 20 to provide the desired delay. In general it is desirable that the overall cumulative delay for stages 21-1 through 21-6 be twice as long as the duration of any noise burst, signal fading, interference or other error-causing effects associated with the transmission channel in the FIG. 1 apparatus. In FIG. 2, each of the stages 21 has an approximately one second delay so that the overall cumulative delay is approximately 7 seconds. Accordingly, the FIG. 2 embodiment is effective for error-causing effects which are less than approximately 3.5 seconds in duration.

In FIG. 2, for asynchronous operation, the phase of clock 20 need not have any relationship to data transitions on the data input line 14. Also, while delay stages 21 have been selected as shift register stages, any other apparatus which accurately delays input binary signals can be employed in the present invention. Delay stages may be employed which do not require a clock for timing. For example, the serial input data on line 14 can be written onto a circulating magnetic disc with a write head where each of the output signals DT1 through DT6 is obtained from read heads spaced at successive distances (and hence delays) from the write head.

In FIG. 2, the multiplexer 5 is any standard multiplexer from a voice frequency telegraph group. For example, the Western Electric model 43 A1 is such a multiplexer.

The multiplexer 5 has seven frequency bands F0, F1, . . . F6. The frequency bands are utilized in a scattered order with respect to the order of the transmitter diversity data streams. In one embodiment, the data streams DT0, DT1, DT2, DT3, DT4, DT5, and DT6 connect to the frequency bands F2, F6, F0, F3, F5, F1, and F4, respectively. In one implementation, the frequency bands each have a band width of ±42.5Hz about center frequencies. The center frequencies for the bands F0, F1, . . . , F6 are 765, 1105, 1445, 1785, 2125, 2465, and 2805Hz, respectively. Of course, these values are only one preferred embodiment as many other alternatives can be employed.

Figure 3:
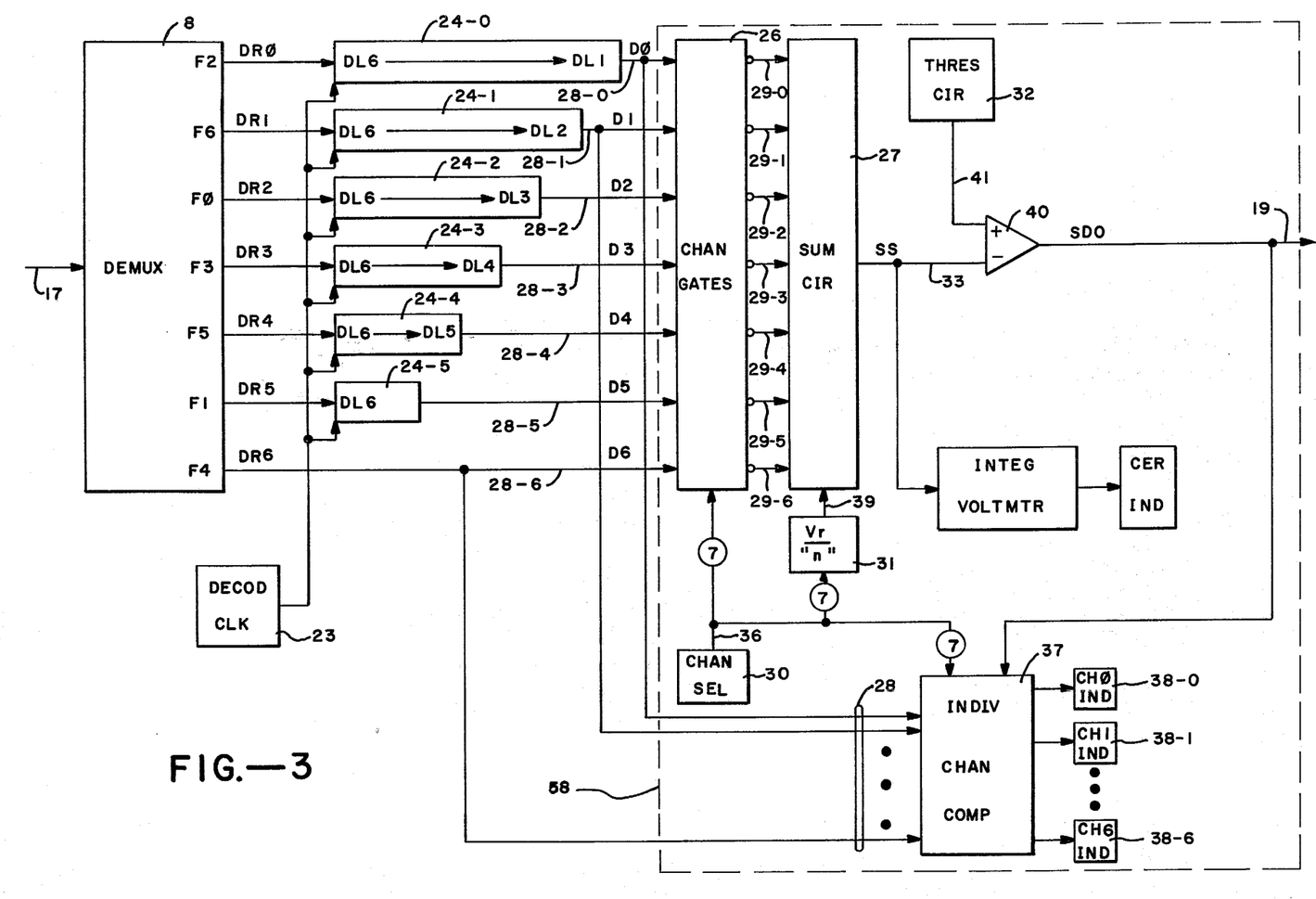
FIG. 3 depicts a schematic representation of a frequency demultiplexer and a data decoder which form part of the receiver circuitry within the system of FIG. 1.

DIVERSITY DECODER — FIG. 3

In FIG. 3, one preferred embodiment of a diversity decoder 9 is shown receiving receiver diversity data streams from a demultiplexer 8. The demultiplexer 8 is a conventional device which demultiplexes the signals on the data path 17 to form the receiver diversity data streams. The diversity data streams DR0, DR1, . . . , DR6 are demultiplexed from the frequency bands F2, F6, F0, F3, F5, F1, and F4, respectively. Accordingly, the receiver diversity data streams DR0, DR1, . . . , DR6 in FIG. 3 correspond to the transmitter diversity data streams DT0, DT1, . . . , DT6, respectively, in FIG. 2.

In FIG. 3, the diversity data stream DR0 through DR5 connect to the delay circuits 24-0 through 24-5, respectively. Since the DT0 signal was not delayed at all in FIG. 2, the corresponding signal DR0 receives the maximum delay of six stages in delay circuit 24-0 of FIG. 3. The delayed signal D) is output from stage 24-0 on line 28-0. Delay circuit 24-0 includes a delay equal to all six of the stages DL0 through DL6 in FIG. 2. In a preferred embodiment, delay circuit 24-0 includes six shift register stages of 2048 bits per stage.

In FIG. 3, the delay circuit 24-1 includes a delay equivalent to the five stages DL2 through DL6 in FIG. 2. Since the DT1 signal received the one stage delay DL1 in FIG. 2, the corresponding signal DR1 is further delayed in FIG. 3 for the five stages DL2 through DL6. The output D1 on line 28-1 has received a full six stage delay. In a similar manner, the delay circuits 24-2, 24-3, 24-4 and 24-5 have delays equal to the four stages DL3 through DL6, the three stages DL4 through DL6, the two stages DL5 through DL6, the one stage DL6, respectively. The delays 24-2 through 24-5 when coupled with the delays in the encoder of FIG. 2 for the corresponding signals all total the maximum six stage delay. Similarly, the DR6 signal is not delayed in the FIG. 3 circuitry since the corresponding signal DT6 in FIG. 2 receives the maximum delay DL1 through DL6 in the FIG. 2 encoder.

Because of the operation of the delay circuits 24 in FIG. 3, all of the signals on lines 28-0 through 28-6 have the time and diversity removed so that they are each an in phase representation of the data input signal on line 14 to the encoder of FIG. 2. The in-phase signals on lines 28 are delayed relative to the input signal on line 14 an amount equal to the six stage delay DL1 through DL6 plus any delay resulting from transmission.

In a preferred embodiment, the delay circuits 24-0 through 24-5 are implemented with six, five, four, three, two, and one shift register stages with 2048 bits per stage. Each of those shift register stages is clocked by a decoder clock 23. The decoder clock 23 in FIG. 3 is like the encoder clock 20 in FIG. 2 and has a 2K Hz output frequency Clock 23 is also crystal controlled so that its output frequency varies approximately less than one part in $10^5$. Since clocking circuits having this degree of accuracy are standard components in the data processing field, they are conveniently employed in a preferred embodiment. If the clocks 20 and 23 were less accurate, the invention would still work as intended. If the variations between the frequencies of clocks 20 and 23 became great enough, however, errors would be introduced as a function of the magnitude of the variations.

The signals on lines 28 are input to channel gates 26. Channel gates 26 function to determine which ones of the delayed signals D0, . . . , D6 on lines 28 are actually active in the operation of the FIG. 3 data decoder. The gates 26 allow any combination of channels up to a total of seven channels to be active. The diversity system of the preferred embodiment requires three or more channels. If all channels are active, then the gates 26 may be eliminated and lines 28 merely connect to the corresponding lines 29.

The active data signals on the lines 29 connect to the summing circuit 27. Circuit 27 operates to form the algebraic sum of the signals on lines 29 to form a sum signal on line 33. The signal on line 33 is compared with a threshold level in comparator 40. A threshold level is provided by threshold circuit 32. If the level of the sum signal on line 33 is more positive than the level on line 41, the output from comparator 40 is a logical 0 and if the level on line 41 is more positive than the level on line 33 the output is a logical 1. The output from comparator 40 on line 19 has a serial data format and has the benefit of the forward error correction of the present invention.

In FIG. 3, the summing circuit 27 receives a summing voltage on line 39 from a voltage generator 31. The voltage generator 31 provides a DC level which is proportional to the reference voltage, Vr, divided by the number, $n$, of channels selected to be active by the channel gates 26. Both the channel gates 26 and the voltage generator 31 are controlled by the seven control lines 36, one corresponding to each of the seven data lines 28. The channel selector 30 can be any conventional storage device such as seven on/off manual switches or a 7-bit register.

In FIG. 3, the signals on the data lines 28 are also input to the individual channel comparator circuit 37. In comparator circuit 37, each of the active data lines 28 is compared with an error-corrected data output signal on line 19. The seven indicators 38-0 through 38-6 function to indicate, for each of the active channels, which channels have the same level as the error-corrected data output on line 19.

Figure 4:
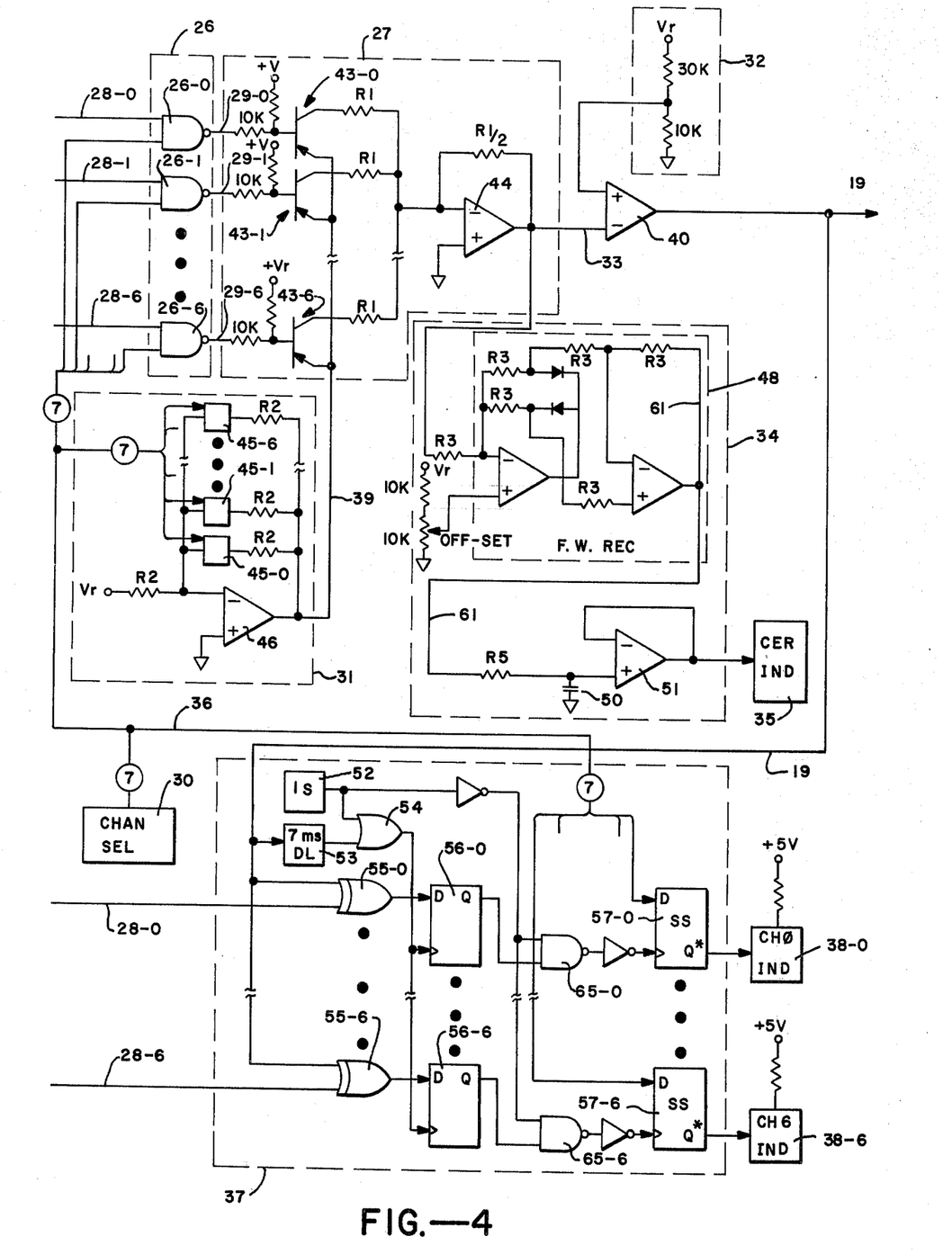
FIG. 4 depicts an electrical schematic representation of a portion of the FIG. 2 data decoder.

ERROR-CORRECTING AND ERROR-INDICATING CIRCUITRY — FIG. 4

In FIG. 4, the error correcting and indicating circuitry 58 of FIG. 4 is shown in further detail. The channel selection gates 26 include the NAND gates 26-0 through 26-6. Gates 26 each receive one of the seven control inputs from the 7-bit channel selection bus 36. Bus 36 is derived from the channel selection unit 30. Unit 30 is any conventional switching device which provides control outputs. For example, unit 30 can include seven manual switches or a 7-bit register. Those gates 26 which receive a logical 1 from bus 36 are enabled. The enabled ones of the gates 26 invert and pass the logical 1 or 0 signal on the respective input line 28 to the corresponding output line 29. When any one of the gates 26 receives a logical 0 input from bus 36, that gate is forced to have a logical 1 on its output line 29 irrespective of the 1 or 0 condition of its input line 28.

In FIG. 4, the variable reference generator 31 provides an output signal on line 39 which is determined by the number, $n$, of active channels. The number of active channels is determined by the channel selection unit 30. Unit 30 also controls the open or closed condition of the switches 45. Switches 45 are, for example, conventional relays each controlled open or closed by one of the lines from bus 36. The switches 45 function to connect the resistors R2 in the feedback loop between the negative input and the output of conventional amplifier 46. For each line in the bus 36 energized with a 1, the corresponding switch 45 is closed. Therefore, the number of resistors R2 connected in parallel in the feedback loop of amplifier 46 is equal to the number, $n$, of active channels. Under these conditions the output level on line 39 is a positive voltage $-Vr/n$ where Vr is negative.

The outputs 29 from the selection gates 26 connect as inputs to the summing circuit 27. The summing circuit 27 includes the summing transistors 43-0 through 43-6 and the summing amplifier 44. Each of the summing transistors 43 is associated with a 10K base resistor and a tie-up resistor connected to a positive voltage equal to $|Vr|$. The base resistors connect each of the bases to a corresponding one of the inputs from selection gates 26.

The summing transistors 43-0 are emitter-coupled having their emitters connected in common to a reference potential on line 39 from generator 31. Each of the collectors for the transistors 43 connects through a summing resistor R1 to the negative input of a conventional amplifier 44. The value of R1 is typically 100K ohms. The positive input of amplifier 44 is connected to ground. A R1/2 feedback resistor connects from the output to the negative input of amplifier 44.

The sum signal (SS) on line 33 from amplifier 44 has a voltage equal to $(m)Vr/(2n)$ where $m$ is the number of logical 0's on the lines 29. The 0's on lines 29 represent the 1's (marks) for the active ones of the delayed channel data streams on lines 28.

The sum signal output on line 33 is connected to the negative input of a conventional comparator 40. The positive input to comparator 40 is derived from the threshold circuit 32. Threshold circuit 32 establishes a threshold level on the positive input of comparator 40 equal to Vr/4. Whenever the signal on line 33 is more positive than Vr/4, the output on line 19 is a logical 0 and otherwise is a logical 1.

In FIG. 4, the integrating voltmeter 34 can be any conventional device. In one embodiment, voltmeter 34 includes a full wave rectifier 48 which functions to full wave rectify the sum signal on line 33 to provide a rectified signal (FWR) on line 61 representative of the character error rate expected for the signal on line 19. The signal on line 61 is integrated by resistor R5 and capacitor 50. Thereafter, the voltage follower 51 provides the integrated output to the character error rate indicator 35. Indicator 35 can be any conventional indicator, such as a moving vane meter, for indicating the level of the signal output from follower 51.

In FIG. 4, the individual channel comparator unit 37 receives delayed channel signals on lines 28-0 through 28-6 and compares each of them with the error-corrected data output on line 19. The comparison is performed by the EXCLUSIVE-OR gates 55-0 through 56-0. Whenever they are the same, the respective gates 55 provide a 0 output and whenever they are different, the gates 55 provide a 1 output. The comparison outputs from each of the gates 55-0 through 55-6 is stored in one of the conventional D-type flip-flops 56-0 through 56-6, respectively. The flip-flops 56 are periodically clocked through the OR gate 54 every one second, by a one second clock 52, and by delay circuit 53, seven milliseconds after both positive-going and negative-going transitions of the data on line 19. Each 0 stored in the flip-flops 56 designates that the data on the corresponding channels 28 is the same as the error-corrected data on line 19. Whenever a 0 to 1 transition occurs on the Q output of the flip-flops 56, it indicates a lack of comparison between the respective channel and the error-corrected data output. That positive-going transition is connected to the clock input of the respective single-shots 57. Single-shots 57 also receive on their D inputs an enable from the channel selection unit 30. Only those single shots having 1's on their D inputs are clocked to store a 0 on their Q* outputs. The inactive channels have 0's connected to the D inputs of single-shots 57 and therefore those single shots always retain a 1 on their Q* outputs. The Q* outputs from the single shots 57 are connected to the respective channel indicators 38. The channel indicators are any conventional indicators and are, for example, light-emitting diodes. The light-emitting diodes are operative, for example, to indicate with a light output any 0 on the Q* output of the connected single shot. For those Q* outputs having a 1, the light emitting diodes are extinguished.

When no data is being transmitted, no transitions will occur on line 19. Therefore, the 1 sec clock 52 is connected through OR gate 54 to the clock strobe inputs of single shots 57-0 through 57-6 by NAND gates 65-0 through 65-6 to cause the respective indicators 38-0 through 38-6 to flash if any one of the flip-flops 56-0 through 56-6 is holding a 1.

SUMMARY OF OPERATION

The operation of the FIG. 1 apparatus will be described in connection with the sample wave forms of FIG. 5 and TABLE I below. For purposes of explanation, the serial data in (SDI) signal on line 14 has been assumed to be 101101000 . . . 011. The three dots represent all 0's for a duration of 4 or more seconds.

With the SDI signal as indicated, each of the diversity waveforms DT0 through DT6 generated by the FIG. 2 circuitry in the manner previously described. Specifically, The SDI signal is input to the first delay stage 21-1. Since stages 21 are clocked at approximately 20 times the bit rate of the SDI data, each SDI bit actually occupies 20 shift register bits in the stages 21. Of course, each SDI bit is twenty times longer than each shift register bit. For example, a logical 1 is represented by 20 shift register logical 1's and an SDI logical 0 is represented by 20 shift register 0's in the delay stages. In FIG. 2, the seven data streams DT0 through DT6 have the same 1 and 0 bits as the SDI data stream except that they are successively delayed by one second increments and are represented by 20 shift register bits for each SDI bit.

Diversity data streams DT0 through DT6 are frequency multiplexed and transmitted to the receiver circuitry and then demultiplexed into the receiver diversity data streams DR0 through DR6.

In FIG. 3, the diversity data streams are successively delayed to remove the time diversity and to form the delayed data streams D0 through D6. The seven delayed data streams D1 through D6 are shown in TABLE I. For purposes of explanation, it has been assumed that signal fading occurred across all frequencies during transmission starting during the second bit (0) of the SDI signal and lasting for a duration of approximately 2.8 seconds. Thereafter, it has been assumed that perfect transmission occurred except in the F4 channel where the sixth and the next to last bits of DT6 were obliterated and caused to be 0 instead of 1.

TABLE I

| SDI | 1 | 0 | 1 | 1 | 0 | 1 | 0 | 0 | 0 | ... | 0 | 1 | 1 |
|---|---|---|---|---|---|---|---|---|---|---|---|---|---|
| D0 | 1 | 0 | 0 | 0 | 0 | 0 | 0 | 0 | 0 | ... | 0 | 1 | 1 |
| D1 | 0 | 0 | 0 | 0 | 0 | 0 | 0 | 0 | 0 | ... | 0 | 1 | 1 |
| D2 | 0 | 0 | 0 | 0 | 0 | 0 | 0 | 0 | 0 | ... | 0 | 1 | 1 |
| D3 | 1 | 0 | 1 | 1 | 0 | 1 | 0 | 0 | 0 | ... | 0 | 1 | 1 |
| D4 | 1 | 0 | 1 | 1 | 0 | 1 | 0 | 0 | 0 | ... | 0 | 1 | 1 |
| D5 | 1 | 0 | 1 | 1 | 0 | 1 | 0 | 0 | 0 | ... | 0 | 1 | 1 |
| D6 | 1 | 0 | 1 | 1 | 0 | 0 | 0 | 0 | 0 | ... | 0 | 0 | 1 |
| SS | 5 | 0 | 4 | 4 | 0 | 3 | 0 | 0 | 0 | ... | 0 | 6 | 7 |
| SDO | 1 | 0 | 1 | 1 | 0 | 0 | 0 | 0 | 0 | ... | 0 | 1 | 1 |

TABLE I-continued

| SDI | 1 | 0 | 1 | 1 | 0 | 1 | 0 | 0 | 0 | ... | 0 | 1 | 1 |
|---|---|---|---|---|---|---|---|---|---|---|---|---|---|
| CER | 2 | 0 | 3 | 3 | 0 | 3 | 0 | 0 | 0 | ... | 0 | 1 | 0 |

With these assumptions, referring to TABLE I, the data stream D0 correctly has a 1 for the first bit and a 0 for the second bit but the 1's for the third, fourth and sixth bits are erroneously 0's. These incorrect bits are a result of the 2.8 second signal fade. The first bit and the last three bits of the D0 signal are not affected by the signal fade since the signal fade commenced after the first bit but terminated before the last three bits.

The 2.8 second signal fade affects only approximately 1.8 seconds of the D1 transmission since D1 is delayed behind D0 approximately 1 second. That 1.8 second signal loss causes the D1 signal to have initially all 0's. The last three bits for the D1 signal are transmitted after the signal fade disappeared, and therefore, they are transmitted without error.

The 2.8 second signal fade affects approximately 0.8 second of the D2 transmission. Therefore the D2 signal also has all 0's initially while the last two bits are transmitted without error. The D3, D4 and D5 signals all are transmitted without error after the 2.8 second signal fade and hence appear identical to the SDI signal.

The D6 signal is identical to the SDI signal except for the sixth and next to last bits in which an error has caused the 1's to be 0's.

In FIG. 3, the data streams D0 through D6 as shown in TABLE I are input to the channel gates 26. In the present example, all seven channels are active and are input to the summing circuit 27. The summing circuit 27 sums the D0 through D6 signals of TABLE I to form the SS signal of TABLE I.

In forming the sum for the first bit position, 5 of the 7 waveforms have a 1 and hence the sum for the SS signal is 5. The sum for the remaining bit positions is performed in the same manner so that SS is 504403000 . . . 067 as indicated in TABLE I and shown in FIG. 5. In FIG. 5, the maximum amplitude is VR/2. That maximum amplitude in the particular example chosen, is negative and only occurs in the last bit position of the SS waveform.

Figure 5:
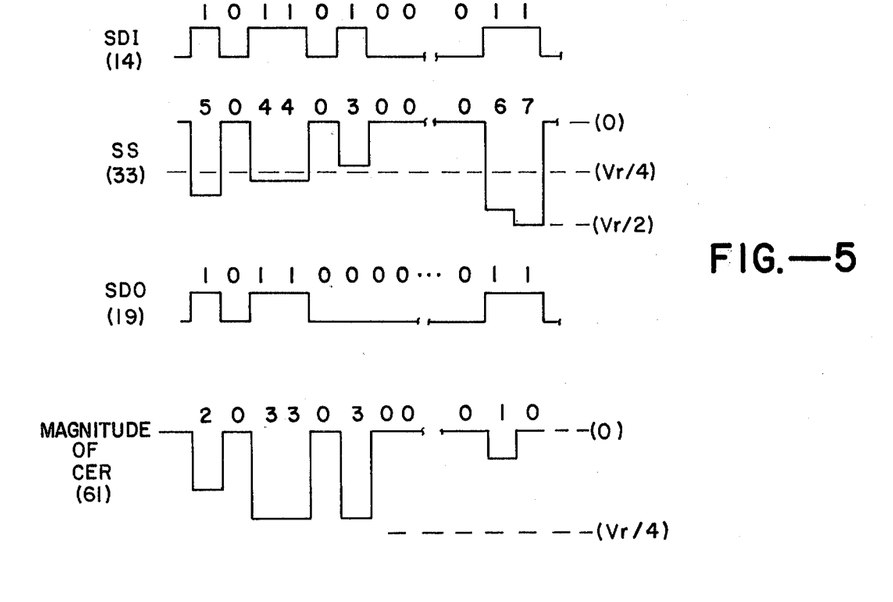
FIG. 5 depicts wave forms representative of the operation of the present invention.

In FIG. 5, the negative threshold level VR/4 is the level provided by the threshold circuit 32 of FIG. 3. For those parts of the SS wave form which extend below the threshold level, a logical 1 appears in the SDO output from comparator 40. All those parts above the threshold level cause a logical 0 for the SDO output. Accordingly the serial data out (SDO) signal on line 19 appears as 101100000 . . . 011. It should be noted that the sixth bit of the SDO signal is a 0 and hence is an error compared to the sixth bit of the SDI signal. This error occurred because only three of the seven data streams contained a logical 1 in the sixth bit position. If the F2 channel had not had errors concurrently with the 2.8 second signal fade, then the D6 wave form would have been identical to the SDI signal without error.

In FIG. 5, the CER waveform represents the signal on line 61 which is output from the full wave rectifier 48. Rectifier 48 functions to fold the SS signal on line 33 about the Vr/4 level and to rectify the folded signal to form the signal on line 61. The signal on line 61 is limited between 0 and Vr/4 volts. The signal on line 61 is 0 volts whenever the SS signal is at the extreme values, 0 or Vr/2. The closer the SS signal is to the Vr/4 level, the closer the CER signal is to the Vr/4 level. The closer the CER signal is to the VR/4 level, the higher the probable character error rate of the signal on line 19.

While the explanation in FIG. 5 has been given with respect to loss of information due to signal fading where 0's were propagated instead of 1's, the principles equally apply to errors caused by noise bursts which may cause 1's to appear where 0's are expected.

While the invention has been particularly shown and described with reference to preferred embodiments thereof it will be understood by those skilled in the art that various changes in form and details may be made therein without departing from the spirit and the scope of the invention.

What is claimed is:

1. A data transmission apparatus comprising:
   data encoder means responsive to an input data stream having a maximum data rate to form at least three transmitter data streams having time diversity, said transmitter data stream having an encoder data rate substantially greater than said maximum data rate and asynchronous with respect to said input data stream,
   means for transmitting the transmitter data streams,
   means for receiving the transmitted transmitter data streams to form responsively receiver data streams having time diversity,
   data decoder means including means responsive to the receiver data streams to form at least three in-phase data streams having a decoder rate substantially greater than said maximum data rate, including means for summing the in-phase data streams to form a sum data stream, and including means for comparing the sum data stream with a threshold to form the output data stream.

2. The apparatus of claim 1 including a plurality of individual channel comparator means for comparing said receiver in-phase signals with said output data stream.

3. The apparatus of claim 1 including error rate detector means, said error rate detector means having means for folding and full-wave rectifying said sum signal to form a rectified signal to form an error indicating signal which tends to be proportional to the error rate of the output data stream.

4. The apparatus of claim 1 wherein said means for transmitting includes a frequency multiplexer having a frequency band for each of said transmitter data streams, and wherein said means for receiving includes a frequency demultiplexer having a frequency band for each of said receiver data streams.

5. The apparatus of claim 1 including means for changing the number of transmitter and receiver data streams.

6. The apparatus of claim 1 wherein said data encoder means includes at least two encoder delay circuits for delaying said input data stream to form said transmitter data streams and wherein said data decoder means includes at least two decoder delay circuits for delaying said receiver data streams to form said in-phase data streams.

7. The apparatus of claim 6 wherein said delay circuits each includes a plurality of clocked shift register stages.

8. The apparatus of claim 6 wherein said delay circuits each includes a plurality of clocked shift register stages, wherein said data encoder means includes an encoder clock for stepping said encoder delay circuits and wherein said data decoder means includes a decoder clock for stepping said decoder delay circuits.

9. The apparatus of claim 8 wherein said encoder and decoder clocks include means for stepping said shift register stages at said encoder and decoder data rates, respectively.

10. The apparatus of claim 9 including means for generating said encoder and decoder data rates approximately 20 times greater than said maximum data rate.

11. A data transmission apparatus comprising:
    data encoder means responsive asynchronously to an input data stream to form at least three transmitter data streams having time diversity, said data encoder means including at least two encoder delay circuits for successively delaying said input data stream to form said transmitter data streams with time diversity and asynchronous with respect to said input data stream,
    means for simultaneously transmitting said transmitter data streams,
    means for simultaneously receiving the transmitted transmitter data streams to form responsively receiver data streams having time diversity,
    data decoder means for receiving said receiver data streams, said decoder means including a plurality of decoder delay circuits, for delaying a plurality of said receiver data streams to remove the time diversity and form responsively at least three in-phase data streams; and including means for summing the in-phase data streams to form a sum data stream; and including means for comparing the sum data stream with a threshold to form the output data stream.

12. The apparatus of claim 11 wherein each of said delay circuits includes a plurality of clocked shift register stages.

13. The apparatus of claim 11 including n transmitter data streams consisting of the data streams 1, 2, ..., n characterized by increasing time diversity from stream 1 to stream n, including n receiver data streams consisting of the receiver data streams 1, 2, ..., n characterized by increasing time diversity from stream 1 to stream n, and including n in-phase data streams, and
    wherein said means for transmitting includes a frequency multiplexer having n frequency bands consisting of transmitter bands 1, 2, ..., n characterized by increasing frequencies from band 1 to band n;
    wherein said means for receiving includes a frequency multiplexer having n receiver frequency bands consisting of receiver bands 1, 2, ..., n characterized by increasing frequencies that are the same as the transmitter band frequencies from band 1 to band n, respectively, and further including,
    means for connecting the transmitter data stream 1, 2, ..., n to the transmitter bands 1, 2, ..., n in a connection order which differs from the order of the sequence 1, 2, ..., n, and
    means for connecting the receiver bands to the receiver data streams in the same order as the transmitter data streams are connected to the transmitter frequency bands.

14. The apparatus of claim 13 including means for changing the number, n of transmitter and receiver data streams.

15. The apparatus of claim 11 including $n$ transmitter data streams, including $n$ receiver data streams, and including $n$ in-phase data streams and wherein said encoder delay circuits collectively include $n-1$ serially connected encoder delay stages each providing a first delay time; wherein said decoder delay circuits include $n-1$ decoder delay circuits, said decoder delay circuits each providing a different one of a plurality of delay times defined to be equal to $1, 2, \ldots, n-1$ times said first delay time.

16. The apparatus of claim 15 wherein said delay circuits each includes a plurality of clocked shift register stages, wherein said data encoder means includes an encoder clock for stepping said encoder delay circuits and wherein said data decoder includes a decoder clock for stepping said decoder delay circuits.

17. The apparatus of claim 16 wherein said input data stream has a maximum data rate and wherein said encoder and decoder clocks step said shift register stages at a clock rate substantially greater than said data rate.

18. The apparatus of claim 17 including means for generating said clock rate approximately 20 times greater than said maximum data rate.

19. A data transmission apparatus comprising:
data encoder means responsive asynchronously to an input data stream to form $n$ transmitter data streams consisting of transmitter data streams $1, 2, \ldots, n$ where $n$ is equal to three or more, said data encoder means including $n-1$ serially connected encoder delay circuits for successively delaying said input data stream to form said transmitter data streams with time diversity with increasing delay from stream 1 to stream $n$,
means for transmitting simultaneously said transmitter data streams, said means for transmitting including a frequency multiplexer having $n$ frequency bands consisting of transmitter bands $1, 2, \ldots, n$ characterized by increasing frequencies from trasmitter band 1 to transmitter band $n$,
means for simultaneously receiving the transmitted transmitter data streams to form responsively $n$ receiver data streams consisting of the receiver data streams $1, 2, \ldots, n$ corresponding to the transmitter data streams $1, 2, \ldots, n$, respectively,
data decoder means for receiving said receiver data streams, said data decoder means including $n-1$ encoder delay circuits consisting of decoder delay circuits $1, 2, \ldots, n-1$ for delaying $n-1$ of said receiver data streams consisting of receiver data streams $1, 2, \ldots, n-1$ to remove the time diversity and form responsively, with receiver data stream 1, $n$ in-phase data streams; said decoder means including means for summing said in-phase data streams to form a sum data stream; and said data decoder means including means for comparing the sum data stream with a threshold to form an output data stream.

20. The apparatus of claim 19 wherein said $n-1$ encoder delay circuits each includes means for delaying data streams a first delay time and wherein said decoder delay circuits $1, 2, \ldots, n-1$ provide decoder delay times equal to $n-1, \ldots, 2, 1$ multiples of said first delay time, respectively.

21. The apparatus of claim 20 wherein said delay circuits each includes a plurality of clocked shift register stages, wherein said data encoder means includes an encoder clock for stepping said encoder delay circuits and wherein said data decoder includes a decoder clock asynchronous with respect to said encoder clock for stepping said decoder delay circuits.

22. The apparatus of claim 21 wherein said input data stream has a maximum data rate and wherein said encoder and decoder clocks step said shift register stages at a clock rate substantially greater than said data rate.

23. The apparatus of claim 22 including means for generating said clock rate approximately 20 times greater than said maximum data rate.

24. In a data transmission apparatus, the method comprising:
successively and asynchronously delaying an input data stream to form at least three transmitter data streams having time diversity said transmitter data streams asynchronous to said input data stream,
transmitting said transmitter data streams,
receiving the transmitted transmitter data streams to form responsively receiver data streams having time diversity,
successively delaying the receiver data streams to remove the time diversity and form at least three in-phase data streams,
summing the in-phase data streams to form a sum data stream,
comparing the sum data stream with a threshold to form an output data stream.

25. In a data transmission apparatus, the method comprising:
successively delaying an input data stream $n-1$ times to form responsively $n$ transmitter data streams $1, 2, \ldots n$ having time diversity with increasing delay from transmitter data stream 1 to data stream $n$.
transmitting each of said transmitter data streams over a different one of the transmitter frequency bands $1, 2, \ldots, n$, where the frequency bands are characterized by increasing frequencies from band 1 to band $n$, and where the transmitter data streams $1, 2, \ldots, n$ are carried by the frequency bands $1, 2, \ldots, n$ in a connection order different from the order $1, 2, \ldots, n$,
receiving the transmitted transmitter data streams in receiver frequency bands $1, 2, \ldots, n$ corresponding to the frequencies of transmitter frequency bands $1, 2, \ldots, n$, respectively, to form responsively receiver data streams $1, 2, \ldots, n$ having time diversity,
successively delaying the receiver data streams $1, 2, \ldots, n$ with decreasing delay from receiver data stream 1 to data stream $n$ to remove the time diversity and form inphase data streams $1, 2, \ldots, n$, respectively,
summing the inphase data streams to form a sum data stream,
comparing the sum data stream with a threshold to form an output data stream representative of the input data stream.

* * * * *